United States Patent [19]

Hoefer et al.

[11] Patent Number: 4,826,944

[45] Date of Patent: May 2, 1989

[54] POLYURETHANE CASTING RESINS

[75] Inventors: Rainer Hoefer, Duesseldorf; Bert Gruber, Bedburg; Alfred Meffert, Monheim; Roland Gruetzmacher, Wuelfrath, all of Fed. Rep. of Germany

[73] Assignee: Henkel Kommanditgesellschaft auf Aktien, Duesseldorf, Fed. Rep. of Germany

[21] Appl. No.: 94,205

[22] Filed: Sep. 4, 1987

[30] Foreign Application Priority Data

Sep. 5, 1986 [DE] Fed. Rep. of Germany ....... 3630264

[51] Int. Cl.$^4$ .............................................. C08G 18/00
[52] U.S. Cl. ....................................... 528/49; 528/66; 528/74.5; 528/75; 528/76; 528/79; 528/85
[58] Field of Search .................... 528/49, 66, 74.5, 75, 528/76, 79, 85

[56] References Cited

U.S. PATENT DOCUMENTS 4,508,853  4/1985  Kluth et al. ........................... 528/73
4,551,517 11/1985  Herold et al. ......................... 528/60

Primary Examiner—John Kight
Assistant Examiner—Samuel A. Acquah
Attorney, Agent, or Firm—Ernest G. Szoke; Wayne C. Jaeschke; Real J. Grandmaison

[57] ABSTRACT

Reactive resin systems suitable for cast-molding polyurethanes comprise reactive isocyanates and chain extenders for the isocyanates comprising polyol addition products of $C_1$–$C_8$ alcohols and epoxidized triglyceride oils: if desired, the polyol addition products used have been alkoxylated with $C_2$–$C_4$-alkylene oxides.

48 Claims, No Drawings

POLYURETHANE CASTING RESINS

BACKGROUND OF THE INVENTION

1. Field of the Invention

This invention relates to a process for the production of improved polyurethane casting resins.

Polyurethanes have for years been used in many branches of industry: foams, lacquers and adhesives produced from polyurethanes are widely used. Another increasingly important field of application for polyurethanes is that of cast-molded solid or rigid resins. One reason for the increasing use of solid polyurethanes is the fact that they are easily shaped as required by a number of processes: for example, polyurethane elastomers may be extruded, calendered and injection-molded. Vulcanizable, rubber-like polyurethane mixtures are formable by any of the forming techniques commonly used in the rubber industry, and, in addition, solid polyurethane moldings are producible by machine-based or manual casting processes. In this latter field, polyurethane materials compete technologically with unsaturated polyesters, epoxy resins and cold-crosslinking silicone rubbers. By comparison with such other resin systems, especially cold-hardening epoxy resins, polyurethane casting-resin systems are of interest because they are easier to process and are relatively inexpensive raw materials. One important field of application for these systems is in electrical insulation where cast-molded polyurethane materials are much-used as cable sealing compounds, battery seals, cover pottings for capacitors, or as embedding compounds for bell transformers.

2. Discussion of Related Art

Urethane casting resin systems are widely known from the prior art. Broadly, the systems comprise a reactive isocyanate (a compound containing at least two terminal isocyanate ($N=C=O$) groups, herein termed a "polyisocyanate") and a chain extender for the isocyanate, generally termed a "hardener." These two components are homogeneously mixed, optionally in the presence of a catalyst and customary additives such as fillers, pigments, or drying agents. The resulting mixture is then cast into the mold, and hardened by the polyaddition reaction of isocyanate and hardener to form the corresponding urethane polymer, with the result dependent upon the components used, the hardener used, the quantity of catalyst used, and other reaction parameters necessary to the formation of the polymer. Polyurethane casting systems of this type are well-known, and are described, for example, in G. W. Becker and D. Braun *Kunststoffhandbuch*, Vol. VII (Polyurethane), Verlag Hanser, (1983); or in B. A. Dombrow, *Polyurethanes*, 2nd Edition, New York (1965).

Polyether polyols, polyester polyols and polyether polyester polyols are generally employed as chain extenders for the production of polyurethane casting resins. These prior art polyols are typically synthesized from petroleum rather than from renewable raw materials capable of regeneration from natural sources. In view of the increasing shortage of petroleum resources, therefore, there is a need for hardeners for the production of urethane casting resins which are based on regenerable natural sources.

One such natural product which has been proposed as a hardener for the production of urethane casting resins is castor oil. Castor oil was used long ago as a hardener for polyurethane potting compounds for the potting of electronic components ("Plastics Laboratory", Princeton University, "Castor Oil Polyurethanes and Applications as Potting Components", U.S.O.T. page 99165). However, the solid polyurethane materials obtained using castor oil as hardener did not conform to modern requirements with respect to tensile strength, hardness, resistance to distortion under heat, and electrical properties.

BRIEF DESCRIPTION OF THE INVENTION

The present invention provides cast-molded polyurethanes which have improved properties and are optimally adapted to practical requirements. The polymers are prepared from reactive resin systems utilizing inexpensive starting materials which have a greater functional variability than castor oil, and which are obtainable from native, renewable, and continuously self-regenerating raw materials. The cast-molded polyurethane compositions produced by the process of the invention are superior to known cast-resin materials, particularly in regard to hardness, strength, and deflection temperature.

It has now surprisingly been found that polyurethanes having distinctly better properties are obtainable by reaction of the starting reactive isocyanate with a hardener comprising a ring-opening product of the reaction of an epoxidized triglyceride oil with a monohydric lower alcohol.

Cast-molded polyurethanes according to the invention are prepared from a reactive resin system comprising a reactive isocyanate containing at least two isocyanate groups per molecule and a polyhydric alcohol chain extender for the isocyanate containing at least two hydroxy groups per molecule, herein termed a "polyol". The chain extender comprises the reaction product of a monohydric alcohol R—OH, wherein R is $C_1$–$C_8$-alkyl, and an epoxidized triglyceride oil. The optionally purified addition product is, if desired, then reacted with a $C_2$–$C_4$ alkylene oxide, and is further optionally dehydrated by a thermal aftertreatment. The product is then admixed with a reactive isocyanate to form a homogeneous, hardenable, liquid resin reaction mixture. Customary additives for urethane cast-resin systems are optionally incorporated into the mixture, which is then cast-molded.

DETAILED DESCRIPTION OF THE INVENTION

Other than in the operating examples, or where otherwise indicated, all numbers expressing quantities of ingredients or reaction conditions used herein are to be understood as modified in all instances by the term "about".

According to the process of the invention for the production of cast-molded polyurethanes, a monohydric $C_1$–$C_8$ alcohol is added to an epoxidized triglyceride oil.

Suitable alcohols are straight-chain primary $C_1$–$C_8$-alkanols: methanol, ethanol, n-propanol, n-butanol, n-pentanol, n-hexanol, n-heptanol, n-octanol; and/or isomers thereof which are branched in the alkyl chain; and/or isomers thereof which are hydroxyl-substituted at a secondary or tertiary carbon atom. $C_1$–$C_4$ alcohols comprising methanol, ethanol, n-propanol, i-propanol, n-butanol, i-butanol and t-butanol are preferably used for the addition reaction with epoxidized triglyceride oils. Of these alcohols, methanol is particularly preferred by virtue of its inexpensive ready availability and the favorable results obtained.

Epoxidized triglyceride oils of the type used in the process according to the invention are known from the prior art. They are termed "epoxy plasticizers" in other industrial sectors and are commercially obtainable for that purpose. They are conveniently prepared by epoxidation of unsaturated natural oils, for example soya oil, linseed oil, tall oil, cottonseed oil, peanut oil, palm oil, sunflower oil, rapeseed oil or neat's foot-oil, with per-acetic acid, for example by the process described in *J. Am. Chem. Soc.* 67: 412 (1945). Through the epoxidation, the olefinic double bonds of the glyceride-bonded fatty acids comprising the oils are substantially completely or partly converted into oxirane rings, depending on the quantity of per-acetic acid used. Triglycerides suitable as starting materials are those having an iodine number of from 50 to 150 which are convertible into epoxidates which contain from 3 to 10% by weight of epoxide oxygen; these oils are eminently suitable for use in preparing the resin systems according to the invention because, as the polyol component in the polymerization reaction with the reactive isocyanates, they provide polyurethane materials having outstanding strength properties. Epoxidized triglyceride oils containing from 4 to 8% by weight of epoxide oxygen are particularly preferred.

The addition reaction of the monohydric alcohol and the epoxidized triglyceride oil is preferably carried out in the presence of an acidic ring-opening catalyst, as known in the art. Suitable acidic catalysts include typical mineral acids such as concentrated sulfuric acid. However, it is also possible to use Lewis acids, such as boron trihalides or derivatives thereof, or to carry out the reaction in the presence of an acidic ion exchanger. The use of acidic ion exchangers is particularly preferred because the catalyst can be readily separated from the reaction mixture. On completion of the reaction, the ring-opening catalyst may be washed out and precipitated or may remain in the reaction product after neutralization thereof. The preferred procedure is to neutralize the catalyst with sodium methylate or, more especially, with a $C_1$-$C_4$-dialkyl ethanolamine, preferably dimethyl or diethyl ethanolamine, and to leave the neutralization product in the reaction product.

A molar ratio of alcohol to triglyceride oil of from 1.05 to 10, and preferably of from 3 to 10 moles of alcohol per mole of epoxide oxygen, is added to the epoxidized triglyceride to produce a triglyceride reaction product containing at least two free hydroxyl groups per molecule of triglyceride. This means that, in practice, an excess of alcohol is preferably introduced into the addition reaction to ensure that substantially all the oxirane rings are opened and are converted into HO—C—O and C—OR groups, wherein R is the alkyl radical of the alcohol used. The triglyceride addition products are then preferably freed from any unreacted reactants by known methods. For example, alcohol used in excess is typically condensed off from the addition product mixture by distillation, optionally under reduced pressure. However, other methods of purification known in this field may also be used.

The purified addition products are optionally reacted with $C_2$-$C_4$ alkylene oxides. Accordingly, ethylene oxide, propylene oxide or butylene oxide are useful as alkoxylating agents for this alkoxylation reaction. Mixtures of the alkylene oxides may also be used. Ethylene oxide, propylene oxide, or a mixture thereof is preferably used for the alkoxylation reaction because alkoxylation with these two alkoxylating agents gives chain extenders ("hardeners") having particularly good properties which in turn give polyurethane materials characterized by particularly favorable strength and hardness properties. The molar ratio of alkylene oxide to alcohol-modified epoxidized triglyceride oil is advantageously adjusted to 1-50 moles of alkylene oxide per mole of triglyceride epoxide oxygen (based on the epoxide oxygen content of the epoxidized triglyceride oil before ring-opening) for the alkoxylation reaction. In this way, relatively low-viscosity (e.g., 400 to 10,000 mPa.s @ 25° C.) liquid hardeners are obtained for the reaction with the isocyanates, leading to polyurethane materials having properties distinctly better in every respect than obtainable with state-of-the-art hardeners. The low-viscosity hardener materials are also of advantage for particularly favorable handling of the hardener during casting of the isocyanate-hardener mixture.

In addition, it is within the scope of the invention to subject the addition products to a dehydrating thermal after-treatment before and/or after the alkoxylation reaction. In one preferred embodiment, the thermal aftertreatment step is carried out after the alkoxylation reaction. The thermal aftertreatment of the polyol is of advantage because it enables the product to be made substantially anhydrous, which reduces the possibility of generally undesirable bubble formation during subsequent casting of the isocyanate-hardener mixture. In practice, thermal aftertreatment is carried typically out at temperatures of from 30° to 200° C. At the same time, a reduced pressure may also be applied to the reaction mixture. Both measures, applied either separately or together, provide for the substantial removal of any water still present in the reaction mixture and thus reduce the possibility of bubble formation during casting. In another preferred embodiment of the invention, dehydration may be further enhanced by passing steam, hot air or nitrogen gas through the reaction mixture during the thermal aftertreatment. The properties of the hardener are further improved by such a "steaming" step.

In the process according to the invention for the production of solid polyurethanes by casting, the hardeners produced as described above, which are preferably based on epoxidized soya bean oil, epoxidized rapeseed oil or epoxidized linseed oil, are mixed with reactive isocyanates in a ratio of hardener OH groups to isocyanate groups of from 1:0.9 to 1:1.3, and preferably of from 1:1 to 1:1.2. Suitable isocyanates comprise reactive isocyanates containing at least two terminal isocyanate groups of the type customarily used in the production of urethane polymers. The solid polyurethane materials produced by the process according to the invention are typically based primarily on aromatic polyisocyanates containing from 2 to 4 isocyanate groups. It is possible to use compounds in which all the isocyanate groups are attached to one aromatic ring or to several conjugated aromatic rings and also compounds in which the isocyanate groups are attached to several aromatic rings interconnected by alkylene groups, for example methylene groups. Suitable isocyanates are 2,4-tolylene diisocyanate and 4,4'-diphenylmethane diisocyanate ("MDI polymer"); the latter has acquired particular significance in the processing of casting resins and is therefore preferred. In other embodiments of the process according to the invention, the isocyanate component comprises mixtures of 4,4'-diphenylmethane diisocyanate with isocyanates of higher functionality, for example, mixtures with substituted diphenylmethane diisocyanates, wherein the substituent is an aromatic ring containing isocyanate groups. Particular preference is attributed to commercial, liquid crude mixtures of diphenylmethane diisocyanate (MDI polymer) which still contain oligomeric polyphenylene polymethylene polyisocyanates. Among these liquid crude mixtures, those having an average functionality of from 2 to 2.5 isocyanate groups per molecule are particularly suitable.

According to the invention, the isocyanate component(s) and hardener are mixed to form a homogeneous, liquid resin mixture. It has proved to be of particular advantage at this mixing stage to use components of very low viscosity, e.g., from between about 400 to 10,000 mPa.s @ 25° C. The use of such low-viscosity components is of importance in several applications, particularly to the use as casting resins for the production of cast-molded solid polyurethanes.

If desired, standard additives of the type commonly used in polyurethane materials are added to the polymerization mixture after a homogeneous resin mixture has been obtained. Suitable additives are, for example, fillers, pigments, and/or drying agents. In one preferred embodiment of the process, for example, zeolite pastes are added to the polymerization mixtures as drying agents. The use of additives in the production of polyurethane is well-understood in the art, and those guidelines are to be followed here.

The mixing of the isocyanate component(s) with the hardeners of the invention is also carried out in known manner, for example, in standard reaction mixing vessels. The homogeneous, liquid resins polymerization mixtures optionally containing additives are then cast into the molds where they are left to harden, optionally at slightly elevated temperatures, as used in the art.

Surprisingly, the process according to the invention for the production of solid polyurethane provides new materials which are distinctly superior to the materials known from the prior art in regard to hardness, strength and deflection temperature and which, in addition, also give improved values for electrical volume resistance. Accordingly, these new materials are particularly suitable for applications associated with electrical insulation. In addition, the polyurethanes of the invention are obtainable from renewable sources which are readily derived therefrom in high yields by inexpensive processes. By varying the process conditions, it is possible to prepare polyurethanes having a broad spectrum of properties.

The invention is illustrated by the folowing Examples.

EXAMPLE 1

Ring-opening product of an epoxidized soya bean oil with methanol, not thermally aftertreated.

657 kg of methanol and 1.7 kg of $H_2SO_4$ (conc.) are introduced into a reaction vessel equipped with a reflux condenser and heated under reflux to the boiling temperature (approx. 65° C.). 890 kg of a commercial soya bean oil epoxide (Edenol ® D 81) containing 6.3% by weight of epoxide oxygen are gradually introduced into the boiling solution. The solution remains at boiling temperature under the effect of the heat of reaction. On completion of the addition, the reaction mixture is stirred for 7.5 hours at 65° C. It is then neutralized with 6 kg of a 30% by weight solution of sodium methylate in methanol and the excess methanol (approx. 547 kg) is completely distilled off, leaving behind approx. 1000 kg of the reaction product in the form of a pale yellow, clear liquid.

EXAMPLE 2

Ring-opening product of an epoxidized soya bean oil with methanol, thermally aftertreated.

The ring-opening product of an epoxidized soya bean oil with methanol prepared in accordance with Example 1 is heated to 130° C. in a reaction vessel. Wet steam is then passed through the material which is slowly heated to 160° C. On reaching the temperature of 160° C., the passage of steam through the material is continued for 1 hour. Thereafter the stream of steam is shut off and a vacuum carefully applied; the temperature in the reaction vessel may fall to around 120° C. The reaction mixture is then dehydrated for about 2 to 4 hours at 120° to 130° C. in a water jet vacuum (approx. 20 mbar) until a water content of <0.05% (K. Fischer) is reached.

EXAMPLE 3

Ring-opening product of an epoxidized soya bean oil with methanol, catalyst remaining in the reaction product after neutralization with a dialkyl ethanolamine.

4000 kg of epoxidized soya bean oil and 2920 kg of methanol are introduced into a stirring vessel and heated to 40° C. 5.1 kg $H_2SO_4$ (dissolved in 10 kg methanol) are added at that temperature. The temperature increases to around 50° C. After the exothermic reaction has abated, the reaction mixture is slowly heated to the reflux temperature. To monitor the reaction, a sample is taken after 3 h and the epoxide content determined (% EpO=0.7 to 1.0). After 4 hours, 5.1 kg of $H_2SO_4$ (in 10 kg methanol) are added and, after the exothermy has abated (approx. 10 mins.), the rest of the $H_2SO_4$ (5.1 kg in 10 kg $CH_3OH$) is added to the mixture. To monitor viscosity, a sample is taken afer 9 hours (approx. 1200 mPa.s). If the viscosity is of the required order, the pH may be adjusted to 7-8 with 20 kg diethanolamine after about 10 hours. The pH-value is monitored with conventional pH paper (Merck GmbH, Darmstadt, Germany). The excess methanol is then distilled off. The final traces of methanol are removed by application of vacuum.

The following Examples were carried out following the procedures of Example 1, except Example 4 followed the process of Example 2.

EXAMPLE 4

Partial ring-opening of an epoxidized soya bean oil with methanol, thermally aftertreated.

EXAMPLE 5

Ring-opening product of epoxidized rapeseed oil with methanol.

EXAMPLE 6

Ring-opening product of two different partially epoxidized soya bean oils with methanol.

EXAMPLE 7

Ring-opening product of an epoxidized soya bean oil with n-butanol.

EXAMPLE 8

Ring-opening product of an epoxidized soya bean oil with n-octanol.

EXAMPLE 9

Ring-opening product of an epoxidized linseed oil with methanol.

The polyol hardener components obtained in accordance with Examples 1 to 9 had the properties listed in Table 1 below.

TABLE 1

Properties of the products obtained in accordance with Example 1 to 9

| Product Example | Viscosity (at 25° C. mPa.s) | OH no. | S. no. | I no. |
|---|---|---|---|---|
| 1 (C) | 550 | 232 | 159 | 14 |
| 2 (B) | 760 | 209 | 162 | 14 |
| 3 (D) | 640 | 225 | 161 | 19.6 |
| 4 (A) | 7,300 | 140 | 173 | 36 |
| 5 (E) | 520 | 220 | 157 | 10 |
| 6 (F) | 800 | 147 | 171 | 44 |
| 6 (G) | 1,100 | 158 | 172 | 36 |
| 7 (H) | 7,500 | 124 | 164 | 34.4 |
| 8 (I) | 4,600 | 109 | 145 | 31.5 |
| 9 (L) | 1,100 | 288 | 148 | 23 |

COMPARISON EXAMPLE 1

A commerically available castor oil having the following characteristic data was used as the polyol component (X):

| | |
|---|---|
| Viscosity at 25° C. (mPa.s) | 700 |
| OH no.: | 161 |
| S. no.: | ca. 180 |
| I. no.: | 86 |

COMPARISON EXAMPLE 2

A commerically available, tetrafunctional, highly branched polyether polyol was used as the polyol component (Y). The compound had a viscosity of 30,000 mPa.s at 25° C. and an OH no. of approx. 768.

EXAMPLE 10

The polyol components described in Examples 1 to 9 and in Comparison Examples 1 and 2 were mixed the quantities (parts by weight) shown in Table 2 with quantities of diphenylmethane diisocyanate (MDI polymer) also shown in Table 2 in a standard mixing apparatus and a drying agent (zeolite paste) introduced as additive in the quantities (parts by weight) shown in Table 2. No catalyst was used in the production of these casting resin compositions.

TABLE 2

Casting resins without catalyst (a) Composition of casting resin — Individual constituents (parts by weight)

| Polyol | | | | | | | | | | | | | | | |
|---|---|---|---|---|---|---|---|---|---|---|---|---|---|---|---|
| A | 100 | | | | | | | | | | | | 50 | | |
| B | | 100 | | | | | | | | | | | | 50 | |
| C | | | 100 | | | | | | | | | | | | |
| D | | | | 100 | | | | | | 90 | 95 | | | | |
| E | | | | | 100 | | | | | | | | | | |
| F | | | | | | 100 | | | | | | | | | |
| G | | | | | | | 100 | | | | | | | | |
| H | | | | | | | | 100 | | | | | | | |
| I | | | | | | | | | 100 | | | | | | |
| X | | | | | | | | | | | | 100 | 50 | 50 | |
| Y | | | | | | | | | | 10 | 5 | | | | |
| L | | | | | | | | | | | | | | | 100 |
| Isocyanate MDI polymer | 41 | 60 | 65 | 63 | 62 | 42 | 45 | 36 | 31 | 79 | 72 | 44 | 42 | 53 | 77 |
| Drying agent zeolite paste | 10 | 10 | 10 | 10 | 10 | 10 | 10 | 10 | 10 | 10 | 10 | 10 | 10 | 10 | 10 |

(b) Properties of casting resin after reaction

| Shore A hardness | | | | | | | | | | | | | | | |
|---|---|---|---|---|---|---|---|---|---|---|---|---|---|---|---|
| after 24 h | 45 | 18 | 25 | 20 | — | — | — | — | — | — | — | 67 | 55 | 30 | — |
| after 48 h | — | — | — | — | 47 | 30 | — | — | — | — | — | 70 | 80 | 40 | — |
| after 72 h | — | — | — | — | 74 | 48 | 67 | 65 | 57 | — | — | 72 | 81 | 72 | — |
| after 196 h | — | — | — | — | — | 78 | 87 | 81 | 66 | — | — | 75 | 87 | 84 | — |
| Shore D hardness | | | | | | | | | | | | | | | |
| after 24 h | — | — | — | — | — | — | — | — | — | 55 | 32 | — | — | — | 56 |
| after 48 h | 20 | 19 | 25 | 20 | — | — | — | — | — | 65 | 50 | — | 22 | — | 70 |
| after 72 h | 29 | 35 | 43 | 35 | — | — | — | — | — | 71 | 59 | — | 25 | — | 73 |
| after 192 h | 55 | 57 | 65 | 61 | 47 | 21 | 28 | 23 | <20 | 75 | 69 | — | 30 | 27 | 78 |

EXAMPLE 11

Casting resin compositions, of which the individual constituents are shown in Table 3, were prepared in the same way as in Example 10, except that the quantities of catalyst (in parts by weight) shown in Table 3 were added. The properties of the casting resin materials obtained after hardening are also shown in Table 3.

The catalyst employed in the Examples is a conventional catalyst for isocyanate reactions (diazobicyclooctane, Dabco) (Air Products GmbH, Düsseldorf, Germany).

TABLE 3

Casting resins with catalyst (a) Composition of casting resin — Individual constituents (parts by weight)

| Polyol | |
|---|---|
| A | 100 |

TABLE 3-continued

| Casting resins with catalyst | | | | | | |
|---|---|---|---|---|---|---|
| B | | 100 | | | | |
| C | | | 100 | | | |
| D | | | | 100 | | |
| X | | | | | 100 | |
| L | | | | | | 100 |
| Isocyanate MDI polymer | 41 | 60 | 65 | 63 | 44 | 77 |
| Drying agent zeolite paste | 10 | 10 | 10 | 10 | 10 | 10 |
| Catalyst Dabco 33 LV (Air Products) | 0.4 | 0.4 | 0.4 | 0.4 | 0.4 | 0.4 |
| (b) Properties of casting resin after reaction | | | | | | |
| Shore A hardness | | | | | | |
| after 24 h | — | — | — | — | 70 | — |
| after 48 h | — | — | — | — | 72 | — |
| after 72 h | — | — | — | — | 73 | — |
| after 192 h | — | — | — | — | 74 | — |
| Shore D hardness | | | | | | |
| after 24 h | 24 | 53 | 41 | 41 | — | 72 |
| after 48 h | 27 | 55 | 51 | 52 | — | 75 |
| after 72 h | 29 | 57 | 65 | 54 | — | 76 |
| after 192 h | 51 | 64 | 67 | 63 | — | 77 |

EXAMPLE 12

Casting resin compositions were prepared in the same way as in Example 11, with the quantities of catalyst (see Example 11) shown in Table 4 added during mixing of the components.

The properties of the polyurethane materials formed therefrom after reaction are shown in Table 4.

TABLE 4

| Casting resin with catalyst resin | | | | | |
|---|---|---|---|---|---|
| (a) Composition of casting resin Individual constituents (parts by weight) | | | | | |
| Polyol | | | | | |
| A | 100 | | | | |
| B | | 100 | | | |
| C | | | 100 | | |
| D | | | | 100 | |
| X | | | | | 100 |
| Isocyanate MDI polymer | 41 | 60 | 65 | 63 | 44 |
| Drying agent zeolite paste | 10 | 10 | 10 | 10 | 10 |
| Catalyst Dabco 33 LV (Air Products) | 0.8 | 0.8 | 0.8 | 0.8 | 0.8 |
| (b) Properties of casting resin after reaction | | | | | |
| Shore A hardness | | | | | |
| after 24 h | — | — | — | — | 73 |
| after 48 h | — | — | — | — | 74 |
| after 72 h | — | — | — | — | 76 |
| after 192 h | — | — | — | — | 76 |
| Shore D hardness | | | | | |
| after 24 h | 32 | 62 | 53 | 56 | — |
| after 48 h | 33 | 63 | 60 | 61 | — |
| after 72 h | 34 | 63 | 69 | 61 | — |
| after 192 h | 50 | 69 | 70 | 65 | — |
| Tensile strength (mPa) | 5.8 | 18.0 | 14.2 | 17.4 | 4.4 |
| Volume resistivity [0 · cm] | | | | | |
| after 24 h | $3.0 \times 10^{14}$ | $1.8 \times 10^{15}$ | $1.6 \times 10^{15}$ | $1.3 \times 10^{15}$ | $7.6 \times 10^{14}$ |
| after 168 h | $1.4 \times 10^{15}$ | $2.2 \times 10^{15}$ | $2.3 \times 10^{14}$ | $2.2 \times 10^{15}$ | $5.0 \times 10^{14}$ |
| Glass transistion temperature (°C.) | 31 | 55 | 47 | 44 | 8 |
| Deflection temperature under load (°C.) | 48 | 47 | 50 | 48 | 42 |

We claim:

1. A hardenable urethane reactive resin system for preparing cast-molded rigid polyurethanes for insulation coating of electrical components consisting essentially of a reactive polyisocyanate and a hardener for the isocyanate which is the polyol addition product of an epoxidized triglyceride and a monohydric $C_1$–$C_8$-alcohol wherein the addition is carried out in the presence of an acidic catalyst which is neutralized after completion of the addition with diethyl ethanolamine or dimethyl ethanolamine and the neutralized acidic catalyst remains in the reactive resin system as a component thereof.

2. The urethane resin system of claim 1, wherein the hardener is a low-viscosity liquid.

3. The urethane resin system of claim 1, further including a filler, pigment, or drying agent.

4. The urethane resin system of claim 1, wherein the epoxidized triglyceride comprises an epoxidized natural oil.

5. The urethane resin system of claim 4, wherein the triglyceride oil is epoxidized soya bean oil, epoxidized rapeseed oil, or epoxidized linseed oil.

6. The urethane resin system of claim 1, wherein the triglyceride before epoxidation has an iodine number of from 50 to 150.

7. The urethane resin system of claim 1, wherein the triglyceride contains from about 3 to 10% by weight of epoxide oxygen, based on the weight of epoxidized triglyceride.

8. The urethane resin system of claim 1, wherein the triglyceride contains from about 4 to 8% by weight epoxide oxygen.

9. The urethane resin system of claim 7, wherein the triglyceride is an epoxidized natural oil.

10. The urethane resin system of claim 8, wherein the triglyceride is an epoxidized natural oil.

11. The urethane resin system of claim 1, wherein the monohydric alcohol and triglyceride are reacted in a molar ratio of from about 1.05 to 10:1.

12. The urethane resin system of claim 11, wherein the monohydric alcohol and triglyceride are reacted in a molar ratio of from about 3 to 10:1.

13. The urethane resin system of claim 1, wherein the monohydric alcohol is a straight-chain alkanol.

14. The urethane resin system of claim 13, wherein the alkanol is a primary alkanol.

15. The urethane resin system of claim 1, wherein the monohydric alcohol is a branched-chain alkanol.

16. The urethane resin system of claim 1, wherein the monohydric alcohol is methanol, ethanol, n-propanol, i-propanol, n-butanol, i-butanol, or t-butanol.

17. The urethane resin system of claim 16, wherein the alcohol is methanol.

18. The urethane resin system of claim 10, wherein substantially all the oxirane rings are opened in the addition of the monohydric $C_1$–$C_8$-alcohol to the epoxidized triglyceride.

19. The urethane resin system of claim 1, wherein the polyol addition product is alkoxylated with a $C_2$–$C_4$-alkoxide.

20. The urethane resin system of claim 19, wherein the alkoxide is ethylene oxide, propylene oxide, or a mixture thereof.

21. The urethane resin system of claim 20, wherein the alkoxylated polyol comprises the reaction product of the epoxidized triglyceride and monohydric alcohol addition product with alkylene oxide in a molar ratio of from about 1 to 50 moles alkylene oxide per mole triglyceride epoxide oxygen.

22. The urethane resin system of claim 1, wherein the polyol addition product and the reactive polyisocyanate are present in a ratio of polyol hydroxyl groups to polyisocyanate isocyanate groups of from about 1:0.9 to 1.3.

23. The urethane resin system of claim 22, wherein the ratio of polyol hydroxyl groups to polyisocyanate isocyanate groups is from about 1:1 to 1.2.

24. A process for the production of a polyurethane comprising forming a reactive resin system by combining a reactive polyisocyanate with a hardener for the isocyanate which is the polyol addition product of an epoxidized triglyceride and a monohydric $C_1$–$C_8$-alcohol, and reacting the reactive components of the system to form a polyurethane, and wherein the addition is carried out in the presence of an acidic catalyst which is neutralized after completion of the addition with diethyl ethanolamine or dimethyl ethanolamine and the neutralized acidic catalyst remains in the reactive resin system as a component thereof.

25. The process of claim 24, wherein the reactive resin system is a cast-molding system which is cast-molded to form a solid polyurethane.

26. The process of claim 25, wherein the polyol addition product is alkoxylated with a $C_2$–$C_4$-alkoxide.

27. The process of claim 26, wherein the alkoxide is ethylene oxide, propylene oxide, or a mixture thereof.

28. The process of claim 26, wherein the alkoxylated polyol is the reaction product of the alkoxide and the polyol addition product in a molar ratio of from about 1 to 50 moles alkylene oxide per mole triglyceride epoxide oxygen.

29. The process of claim 26, wherein the polyol addition product is purified before alkoxylation.

30. The process of claim 26, wherein the polyol addition product is dehydrated before combining with the reactive isocyanate.

31. The process of claim 24, wherein the resin system further includes a filler, pigment, or drying agent.

32. The process of claim 25, wherein the hardener is a low-viscosity liquid.

33. The process of claim 24, wherein the polyol addition product is purified before being combined with the reactive isocyanate in the reactive resin system.

34. The process of claim 24, wherein the polyol addition product is dehydrated before being combined with the reactive isocyanate in the reactive resin system.

35. The process of claim 34, wherein the polyol addition product is dehydrated by thermal treatment at a temperature of from about 30° to 200° C.

36. The process of claim 35, wherein the polyol addition product is subjected to thermal treatment at reduced pressure.

37. The process of claim 35, wherein the polyol addition product is subjected to thermal treatment and exposure to steam, hot air, or nitrogen.

38. The process of claim 31, wherein a drying agent comprising a zeolite paste is combined in the reactive resin system.

39. The process of claim 24, wherein the epoxidized triglyceride comprises an epoxidized natural oil.

40. The process of claim 24, wherein the triglyceride contains from about 3 to 10% by weight of epoxide oxygen, based on the weight of epoxidized triglyceride.

41. The process of claim 24, wherein the triglyceride contains from about 4 to 8% by weight epoxide oxygen.

42. The process of claim 24, wherein the monohydric alcohol and triglyceride are reacted in a molar ratio of from about 1.05 to 10:1.

43. The process of claim 42, wherein the monohydric alcohol and triglyceride are reacted in a molar ratio of from about 3 to 10:1.

44. The process of claim 42, wherein the monohydric alcohol is a straight-chain alkanol.

45. The process of claim 42, wherein the alcohol is methanol, ethanol, n-propanol, i-propanol, n-butanol, i-butanol, or t-butanol.

46. The process of claim 42, wherein the alcohol is methanol.

47. The process of claim 42, wherein the polyol addition product and the reactive polyisocyanate are present in a ratio of polyol hydroxyl groups to polyisocyanate isocyanate groups of from about 1:0.9 to 1.3.

48. The process of claim 42, wherein the ratio of polyol hydroxyl groups to polyisocyanate isocyanate groups is from about 1:1 to 1.2.

* * * * *

UNITED STATES PATENT AND TRADEMARK OFFICE
CERTIFICATE OF CORRECTION

PATENT NO. : 4,826,944
DATED : May 2, 1989
INVENTOR(S) : Rainer Hoefer et al.

It is certified that error appears in the above-identified patent and that said Letters Patent is hereby corrected as shown below:

At. Col. 10, line 32, in claim 8, after "weight" add --epoxide oxygen--.

Signed and Sealed this

Twenty-fourth Day of July, 1990

Attest:

HARRY F. MANBECK, JR.

Attesting Officer   Commissioner of Patents and Trademarks